United States Patent
Gultekin et al.

(10) Patent No.: US 10,523,480 B1
(45) Date of Patent: Dec. 31, 2019

(54) K-BIT ENUMERATIVE SPHERE SHAPING OF MULTIDIMENSIONAL CONSTELLATIONS

(71) Applicant: NXP B.V., Eindhoven (NL)

(72) Inventors: Yunus Can Gultekin, Eindhoven (NL); Frans M. J. Willems, Geldrop (NL); Wim van Houtum, Sint-oedenrode (NL); Semih Serbetli, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/184,370

(22) Filed: Nov. 8, 2018

(51) Int. Cl.
H04L 27/00 (2006.01)
H04L 27/02 (2006.01)

(52) U.S. Cl.
CPC ......... H04L 27/0006 (2013.01); H04L 27/02 (2013.01)

(58) Field of Classification Search
CPC ........... H04L 25/03242; H04L 27/0006; H04L 27/02
See application file for complete search history.

(56) References Cited

U.S. PATENT DOCUMENTS

| | | | |
|---|---|---|---|
| 7,233,634 B1 * | 6/2007 | Hassell Sweatman | H04L 1/0054 375/146 |
| 7,443,928 B2 * | 10/2008 | Nefedov | H04B 1/7105 375/323 |
| 7,583,763 B2 * | 9/2009 | Nissani (Nissensohn) | H04L 1/02 375/316 |
| 8,059,709 B2 * | 11/2011 | Abou Rjeily | H04B 1/7163 375/239 |
| 8,091,006 B2 * | 1/2012 | Prasad | H03M 13/01 375/267 |
| 8,116,242 B2 * | 2/2012 | Thomas | H04L 1/0052 370/310 |
| 8,165,194 B2 * | 4/2012 | Abou Rjeily | H04L 1/0643 375/239 |
| 8,238,488 B1 * | 8/2012 | Lee | H04L 25/03331 375/262 |

(Continued)

OTHER PUBLICATIONS

Bocherer et al., "High Throughput Probabilistic Shaping with Product Distribution Matching," IEEE, cs.IT, Feb. 24, 2017; 9 pages.

(Continued)

*Primary Examiner* — James M Perez
(74) *Attorney, Agent, or Firm* — Rajeev Madnawat

(57) ABSTRACT

A method for k-bit Enumerative Sphere Shaping (ESS) of multidimensional constellations includes converting a first set of a plurality of uniformly distributed data bits from a serial data bit stream to a first unsigned amplitude sequence comprising a plurality of amplitudes bounded by a spherical constellation of maximum energy levels of a plurality of energy levels, wherein the first unsigned amplitude sequence has a Gaussian distribution and each of the energy levels is determined by a respective one of the amplitudes in the amplitude sequence. The first unsigned amplitude sequence is converted to a first shaped data bit sequence. The first shaped data bit sequence is combined with a second set of a one or more uniformly distributed data bits from the serial data bit stream to form a combined data stream. The combined data stream is mapped to a combined amplitude stream.

20 Claims, 9 Drawing Sheets

(56) References Cited

U.S. PATENT DOCUMENTS

| | | | | |
|---|---|---|---|---|
| 8,346,175 B2* | 1/2013 | Milliner | H04L 25/03242 | 455/63.1 |
| 8,379,768 B2* | 2/2013 | Eckert | H04L 25/03242 | 370/334 |
| 8,660,210 B2* | 2/2014 | Kim | H04L 1/06 | 375/269 |
| 8,665,977 B2* | 3/2014 | Cheng | H04L 27/34 | 375/261 |
| 8,687,749 B2* | 4/2014 | Serbetli | H04L 25/0236 | 375/148 |
| 8,699,599 B2* | 4/2014 | Eckert | H04L 25/03242 | 375/261 |
| 8,718,170 B2* | 5/2014 | Nissani (Nissensohn) | H04L 1/0618 | 375/267 |
| 9,509,533 B2* | 11/2016 | Paker | H04L 25/03242 | |
| 2003/0236076 A1* | 12/2003 | Brunel | H04L 1/0631 | 455/101 |
| 2004/0047426 A1* | 3/2004 | Nissani Nissensohn | H04L 25/0204 | 375/259 |
| 2005/0094742 A1* | 5/2005 | Yee | H03M 13/00 | 375/267 |
| 2005/0135498 A1* | 6/2005 | Yee | H04L 1/0631 | 375/267 |
| 2007/0133709 A1* | 6/2007 | Park | H04L 1/0048 | 375/267 |
| 2007/0283210 A1* | 12/2007 | Prasad | H03M 13/01 | 714/755 |
| 2008/0182521 A1* | 7/2008 | Milliner | H04L 1/206 | 455/63.1 |
| 2008/0212720 A1* | 9/2008 | Abou Rjeily | H04B 1/71637 | 375/341 |
| 2008/0232455 A1* | 9/2008 | Abou Rjeily | H04L 25/03242 | 375/233 |
| 2009/0076743 A1* | 3/2009 | Moseson | G01N 3/42 | 702/42 |
| 2010/0034320 A1* | 2/2010 | Champion | H04L 1/0631 | 375/340 |
| 2010/0054372 A1* | 3/2010 | Eckert | H04L 25/03242 | 375/340 |
| 2010/0248391 A1* | 9/2010 | Garcia Tello | G01N 21/552 | 436/501 |
| 2011/0293052 A1* | 12/2011 | Serbetli | H04L 25/0236 | 375/346 |
| 2014/0146923 A1* | 5/2014 | Paker | H04L 27/0008 | 375/329 |
| 2015/0304069 A1* | 10/2015 | Wu | H04L 25/03242 | 375/341 |
| 2017/0141788 A1* | 5/2017 | Khsiba | H03M 7/3082 | |
| 2018/0191532 A1* | 7/2018 | Mejri | H04L 25/03197 | |
| 2018/0241591 A1* | 8/2018 | Rekaya-Ben Othman | H04L 25/03242 | |
| 2019/0052511 A1* | 2/2019 | Gultekin | H04L 1/0042 | |
| 2019/0081824 A1* | 3/2019 | Arvinte | H04L 25/03216 | |

OTHER PUBLICATIONS

International Telecommunication Union, "A Modem Operating At Data Signaling Rates of Up to 33,600 bit/s for Use on the General Switched Telephone Network and on Leased Point-To-Point 2-Wire Telephone-Type Circuits," ITU-T Recommendation V.34, WTSC Resolution No. 1 procedure, Feb. 1998; 79 pages.

Lang et al., "A Leech Lattice Modem," IEEE Journal on Selected Areas in Communications, vol. 7, No. 6, Aug. 1989, pp. 968-973; 6 pages.

Laroia et al., "On Optimal Shaping of Multidimensional Constellations," IEEE Transactions on Information Theory, vol. 40, No. 4, Jul. 1994, pp. 1044-1056; 13 pages.

Schulte et al., "Constant Composition Distribution Matching," IEEE Transactions on Information Theory, vol. 62, No. 1, Jan. 1, 2016, pp. 430-434; 5 pages.

Wachsmann et al., "Multilevel Codes: Theoretical Concepts and Practical Design Rules," IEEE Transactions on Information Theory, vol. 45, No. 5, Jul. 1999, pp. 1361-1391; 31 pages.

Willems et al., "A Pragmatic Approach to Shaped Coded Modulation," IEEE 1st Symposium on Communications and Vehicular Technology in the Benelux, Oct. 1993; 6 pages.

Bocherer, G. et al. "Matching Dyadic Distributions to Channels", IEEE Computer Society—Data Compression Conference, pp. 23-32 (2011).

Gultekin, Y, C. et al. "Approximate Enumerative Sphere Shaping", IEEE International Symposium of Information Theory, pp. 676-680 (Aug. 16, 2018).

\* cited by examiner

K-BIT ENUMERATIVE SPHERE SHAPING OF MULTIDIMENSIONAL CONSTELLATIONS

FIELD

This disclosure relates generally to data communication, and more specifically to a modified enumerative sphere shaping of multidimensional constellations used for data communication.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Communications systems are often required to operate at higher spectral efficiencies while keeping average transmit power and hardware complexity as small as possible. However, conveying the maximum amount of information for a given power budget has often underutilized available channel capacity (e.g., due to the Shannon limit). This is because most of the standardized data transmission strategies employ uniform signaling schemes where each possible message is transmitted with equal probability. Gaussian signaling is shown to be necessary to improve channel utilization, and have a gap to uniform signaling, which is 0.255 bits per real channel usage in Achievable Information Rate (AIR), or equivalently, 1.54 dB in Signal to Noise Ration (SNR). This gap is referred to as the "shaping gap."

Sequences of one-dimensional, uniform and equidistant signal points form a cubically bounded lattice structure. However, by effectively removing the corners of the cube, and adopting a spherical shape in the limit (e.g., an N-sphere), we obtain the least average energy for a fixed volume of energy states in N dimensions. Accordingly, sphere shaping utilizes communication bandwidth more efficiently from average transmit power perspective.

Enumerative amplitude sphere shaping reduces the SNR gap between the channel capacity (e.g., the Shannon limit) and the realized rate by decreasing the average required signal energy. An enumerative shaper outputs length N amplitude sequences taken from an N-dimensional sphere. In one embodiment, the amplitude sequences are used by a channel encoder to add redundancy in the form of sign bits, (e.g., the channel code bits select the signs of the channel input symbols). This is equivalent to say, that the shaper is used to determine the bits that determine the amplitudes of the channel inputs, (e.g., the amplitude bits). However, especially for large constellations, prescribing all amplitude bits thru enumerative shaping introduces high computational and storage complexities.

Embodiments described herein provide for more efficient enumerative sphere shaping by prescribing a subset (Nk) of the amplitude bits (N(m−1)) (where m is the number of bits that are mapped to a one-dimensional symbol) and having remaining (N(m−1−k)) uniformly distributed to modify a Gaussian distributed amplitude sequence determined by a modified k-bit ESS, such that computational load and storage requirements are significantly reduced while still achieving a significant part of the shaping gain. Enumerative amplitude shaping yields many benefits including a decrease in the SNR required to operate at a specific transmission rate, and enabling changes in the transmission rate without changing the code rate or constellation. Consequently, interference is also decreased, which is important in dense networks (e.g., in an automobile environment). Rate adaptivity is also important to efficiently utilize the communication channel bandwidth.

Figure 1:
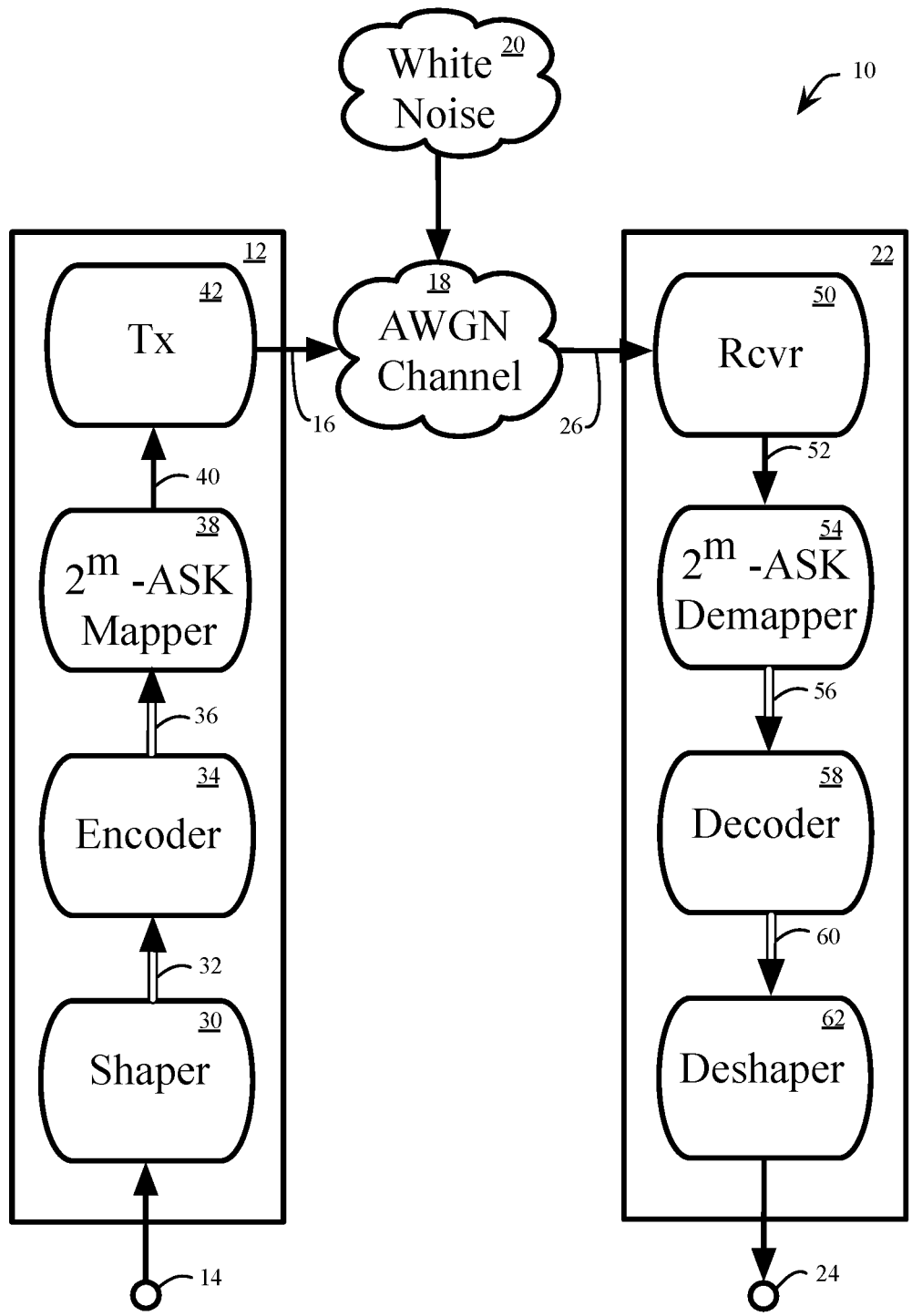
FIG. 1 is a schematic view of a transceiver system comprising a k-bit enumerative sphere shaper (ESS) of a multidimensional constellation in accordance with an example embodiment of the present disclosure.

FIG. 1 shows an example embodiment of a transceiver system 10, comprising a transmit system 12 configured to receive a serial data bit stream 14 and to transmit a shaped encoded symbol stream 16 over an Additive White Gaussian Noise (AWGN) communication channel 18. The AWGN communication channel 18 is shown as being symbolically modified by the white noise 20. In one embodiment, the AWGN communication channel 18 physically inherits the white noise 20 from a variety of sources in the channel space between the transmit system 12 and a receive system 22. The example embodiment of the transceiver system 10 further comprises the receive system 22 configured to generate a serial data bit stream 24 from a shaped symbol stream 26 received from the AWGN communication channel 18.

The transmit system 12 receives the serial data bit stream 14 with a shaper 30. The shaper 30 will be described in further detail with reference to FIG. 5. The shaper 30 converts uniformly distributed information bits from the serial data bit stream 14, into a combined amplitude stream 32 having a one-sided discrete Gaussian distribution. The combined amplitude stream 32 is produced by shaping the information bits from the serial data bit stream 14 using a spherical constellation of maximum energy levels defined by a $2^m$-Amplitude Shift Key (ASK) alphabet, where "m" is the number of bits in a symbol. ASK is a type of modulation method where pulse amplitudes of a serial bit stream are modified by different multipliers (e.g., +/−1, +/−3, +/−5), to encode information to be transmitted or received. A series of modulated information bits constitutes the symbol, which in some embodiments represents a word, idea, object or relationship.

An encoder 34 coverts the combined amplitude stream 32 into a signed amplitude sequence 36 by adding uniformly distributed sign bits to each of the respective amplitudes in the combined amplitude stream 32, while maintaining the Gaussian distribution centered about zero (e.g., resulting in a substantially equal number of positive and negative amplitudes). In another embodiment, the encoder 34 adds some of the sign bits and the remaining sign bits are directly selected by the uniform data. The polarity of the sign bits is a function of the respective amplitude value. In various embodiments, the addition of the sign bits by the encoder further creates code redundancy and error correction. In one embodiment, the encoder uses a convolutional encoding following an IEEE 802.11 protocol. In another embodiment, the encoder uses a Forward Error Correction (FEC) encoding.

A mapper 38 converts the signed amplitude sequence 36 received from the encoder 34, into a transmitter input 40 (e.g., another serial symbol stream). In various embodiments, the transmitter 42 transmits the transmitter input 40 as a shaped encoded symbol stream 16 to the AWGN communications channel 18. In one embodiment, the transmitter 42 comprises an amplifier.

The receive system 22 receives a shaped symbol stream 26 from the AWGN communications channel 18, and produces a receiver output 52 as another serial symbol stream. In various embodiments, the receiver 50 comprises a low noise amplifier. A demapper 54 converts the receiver output 52 into sequence 56 by performing an inverse operation to the mapper 38. In many embodiments, the sequence 56 is a sequence of log-likelihood values. A decoder 58 converts the sequence 56 into an amplitude stream 60 by performing an inverse operation to the encoder 34. In some embodiments, the demapper 54 and the decoder 58 are combined to eliminate the intermediate step of forming the amplitude sequence 56. A deshaper 62 converts the shaped unsigned amplitude stream 60 to a serial data bit stream 24 by performing an inverse operation to the shaper 30. The deshaper 62 will be described in further detail with reference to FIG. 8.

Figure 2:
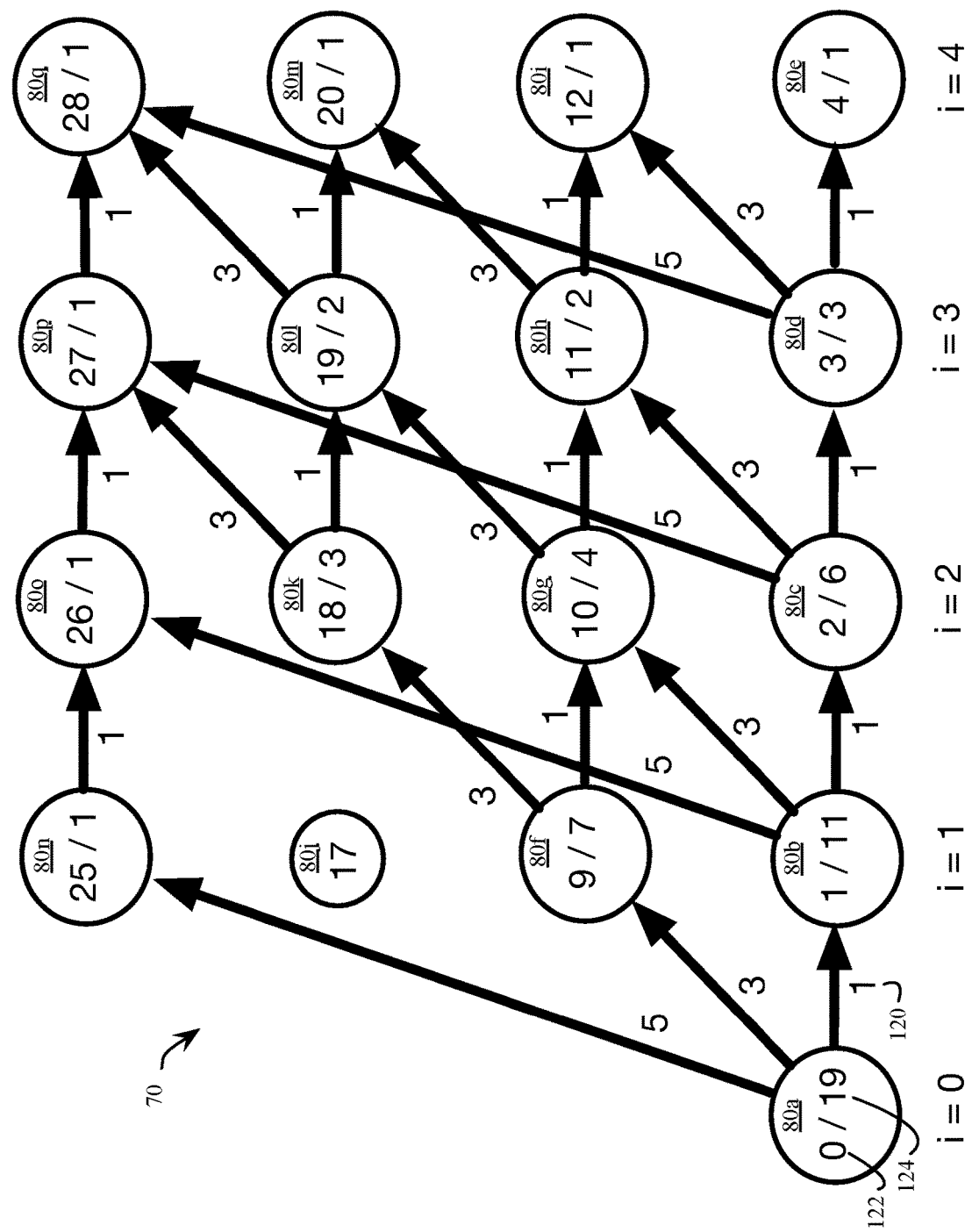
FIG. 2 is a schematic view of a trellis used for ESS.

FIG. 2 shows a trellis 70 based on a one-sided 8-ASK constellation used for the enumerative sphere shaping operation of the shaper 30 of FIG. 1, and of the enumerative sphere deshaping operation of the deshaper 62 of FIG. 1. An 8-ASK modulation method uses equally separated pulse amplitude modulation levels of +1, +3, +5 and +7 as represented on each path by the modulation level 120. The Trellis 70 includes a plurality of energy levels 80a though 80q (generally 80). Each pair of columns represents an indexed path having a modulation level 120 corresponding to one of four modulated bits, wherein four sequential paths (e.g., from i=0 to i=4) represent an amplitude sequence and also a corresponding symbol. Each of the energy levels 80 are annotated with a first number 122 representing the energy of the corresponding energy level, and a second number 124 representing the number of path combinations from that energy level to a maximum energy level defined by the right most column (e.g., energy levels 80e, 80i, 80m and 80q). In the trellis 70 one energy level 80j is not addressable due to the spherical constraint of energy constellation, hence energy level 80j does not have a second number 124.

Each path corresponds to one of the energy-constrained sequences starting at the energy level 80a (or state) with zero energy, and terminating at one of the four maximum energy levels 80e, 80i, 80m or 80q. Each of the energy levels has a first number 122 representing the cumulative energy along the path. For example, if the four pulses are modulated with +1, the path is 80a to 80b to 80c to 80d to 80e for a cumulative energy of 1+1+1+1 or 4, as shown by the first number in energy level 80e. If the path taken is 80a to 80n, the energy is level is $(+5)^2$ or 25 as shown by the first number in energy level 80n. Note that the modulation level 120 is squared to convert an amplitude gain of a transmitted pulse to an energy level, because power is proportional to a voltage squared.

The second number 124 in each energy level defines the number of alternative paths from that energy level to one of the four maximum energy levels 80e, 80i, 80m and 80q. For example starting partially at an interim point of an amplitude sequence, at energy level 80c, the second number shows 6 alternative paths to proceed to one of the four maximum energy levels. The 6 paths are as follows: (1) 80c to 80d to 80e; (2) 80c to 80d to 80i; (3) 80c to 80d to 80q; (4) 80c to 80h to 80i; (5) 80c to 80h to 80m; and (6) 80c to Op to 80q.

Each of the paths listed by the second number 124 is indexed by lexographical ordering over all of the energy constrained sequences, thus reducing the required storage capacity. For example, the path with the least possible cumulative energy is from 80a to 80b to 80c to 80d to 80e, having a total energy of 4. The path with the next smallest cumulative energy consists of N−1 ones and 1 three, or 80a to 80b to 80c to 80d to 80i for a total energy of 12. Paths that include the same total cumulated energy are further separated by differences in cumulative energy during the sequence. In other words, determining the index of a sequence requires counting the number of sequences that are lexicographically prior to that sequence. For example, the sequence 3, 1, 1, 1 defined from 80a to 80f to 80g to 80h to 80m is lexographically prior to the sequence 3, 1, 3, 1 defined from 80a to 80f to 80g to 80j to 80m. The number of sequences that are lexicographically before the sequence 3, 1, 1, 1 is 12 (e.g., 1+11). Conversely, the number of sequences that are lexicographically before the sequence 3, 1, 3, 1 is 13 (e.g., 11+2, given by the second numbers of energy levels 80b and 80h).

Figure 3:
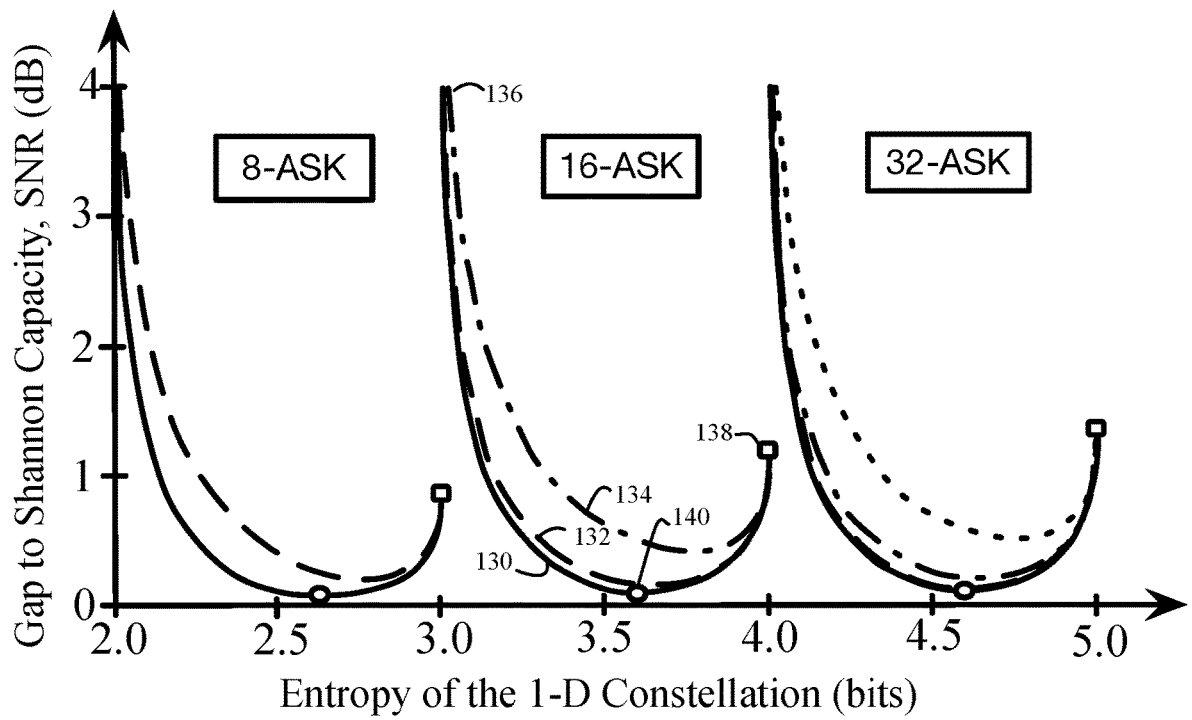
FIG. 3 is a graphical view of Gap-to-Shannon capacity as a function of entropy of a one-dimensional (1-D) constellation, which has a discrete Gaussian distribution, for example embodiments using a k-bit ESS.

FIG. 3 shows the reduction of the Gap-to-Shannon capacity by using shaped and encoded modulation with a k-bit ESS for a one-dimensional (1-D) constellation. FIG. 3 shows for 8-ASK, 16-ASK and 32-ASK constellations, the change in gap-to-capacity for various numbers of shaped bits chosen from a total number of uniform bits from the serial data bit stream 14 of FIG. 1. Specifically, for 16-ASK, four bits are used to define the 16 modulation levels, with one of the four bits reserved for polarity or sign. Of the three remaining bits, full 3 bit shaping is shown by curve 130, two-bit shaping is shown by curve 132 and one bit shaping is shown by curve 134. The leftmost point 136 corresponds to the capacity with no encoding but has shaping, while the rightmost point 138 corresponds to the capacity with no shaping. The optimal point 140 shows the minimal Gap-to- Shannon capacity (loss) and therefore the best available capacity. FIG. 3 also shows that the curve 130 with full 3 bit shaping and the curve 132 with 2 bit shaping are very similar, and thus the respective optimal points will also be similar.

Figure 4:
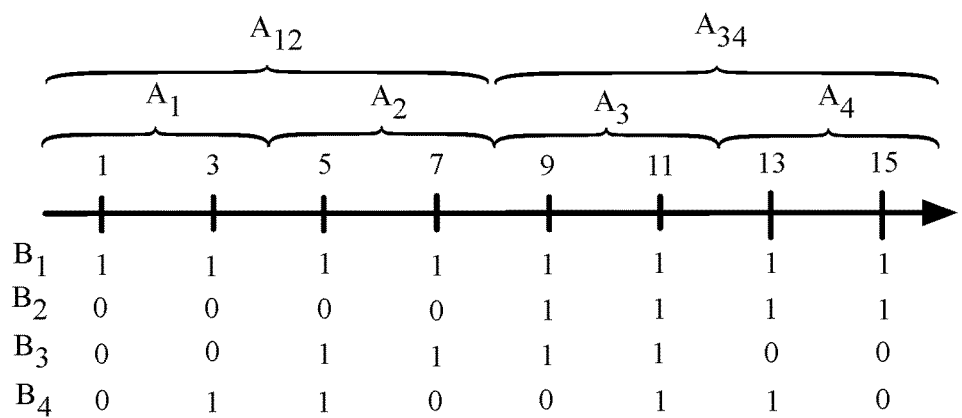
FIG. 4 is an example embodiment of a Gray-coded binary labeling for an ESS system using 16-Amplitude Shift Keying (16-ASK) modulation.
Figure 5:
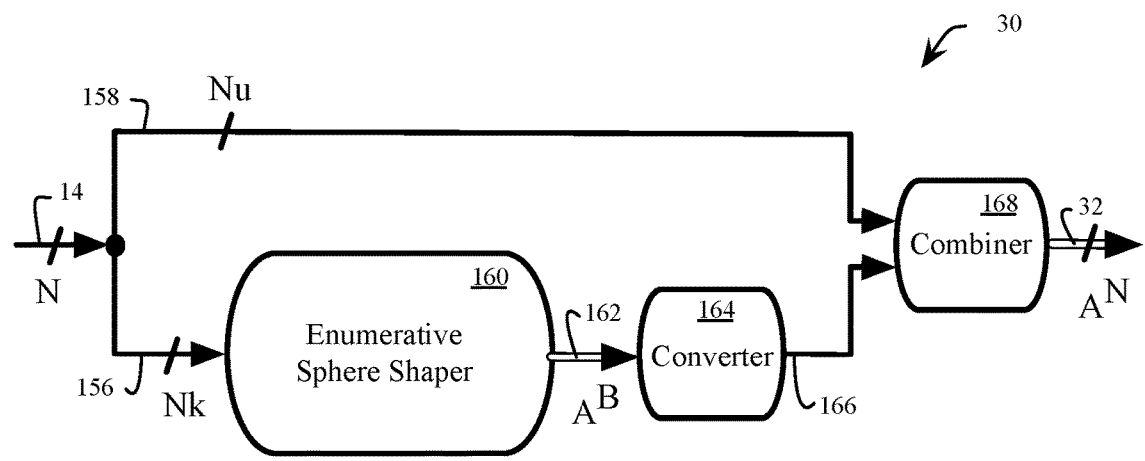
FIG. 5 is a k-bit ESS for a multidimensional constellation in accordance with an example embodiment of the present disclosure.

FIG. 4 shows a Gray-coded binary labeling scheme for 16-ASK modulation. In one embodiment, the Most Significant Bit (MSB) B1 is reserved for the sign bit, while the remaining bits B2, B3, B4 are used for the k-bit ESS. Referring to FIG. 5, the shaper 30 of FIG. 1 is further described. The shaper 30 converts a first set of uniformly distributed data bits 156 from the serial data bit stream 14, while the remaining bit or bits of the serial data bit stream 14 for a second set of uniformly distributed data bit. For example, with reference to FIG. 3 and FIG. 4, in a 16-ASK constellation, B1 is reserved for the encoder 34 sign bit, B2 forms the second set 158 and the remaining bits, B3 and B4, form the first set to be shaped by the ESS 160, thus corresponding to curve 132 of FIG. 3.

The ESS 160 generates a first unsigned amplitude sequence 162. The converter 164 maps the amplitude sequence 162 into a first shaped Data bit sequence 166. In one embodiment, the converter 164 mapping uses the same circuit and methodology as the mapper 38 of FIG. 1. The combiner 168 combines the first shaped data bit sequence 166 and the second set 158 to form a combined data stream, and then maps the combined data stream to form a combined amplitude stream 32. In one embodiment, the mapping function of the combiner 168 uses the same circuit and methodology as the mapper 38 of FIG. 1.

Figure 6:
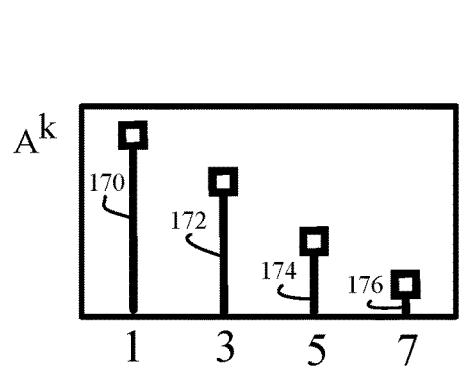
FIG. 6 is a graphical view of an output amplitude distribution $A^B$ of the ESS of FIG. 5.
Figure 7:
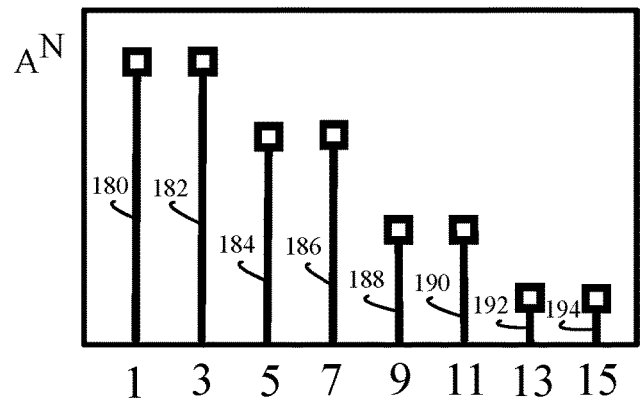
FIG. 7 is a graphical view of an output amplitude distribution $A^N$ of the embodiment of FIG. 5.

Referring now to FIG. 6 and FIG. 7 with ongoing reference to FIG. 5, the unsigned Gaussian distribution of the first unsigned amplitude sequence 162 is shown in FIG. 6, as a result of shaping two bits. Specifically, the amplitude sequence of FIG. 6 comprises amplitudes 170, 172, 174 and 176 corresponding to respective amplitudes 1, 3, 5 and 7. FIG. 7 shows the unsigned Gaussian distribution of the combined amplitude bit stream 32. Specifically, the amplitude sequence of FIG. 7 is a piecewise linear approximation to a system that shapes three bits. The amplitude sequence of FIG. 7 comprises amplitudes 180, 182, 184, 186, 188, 190, 192 and 194.

Figure 8:
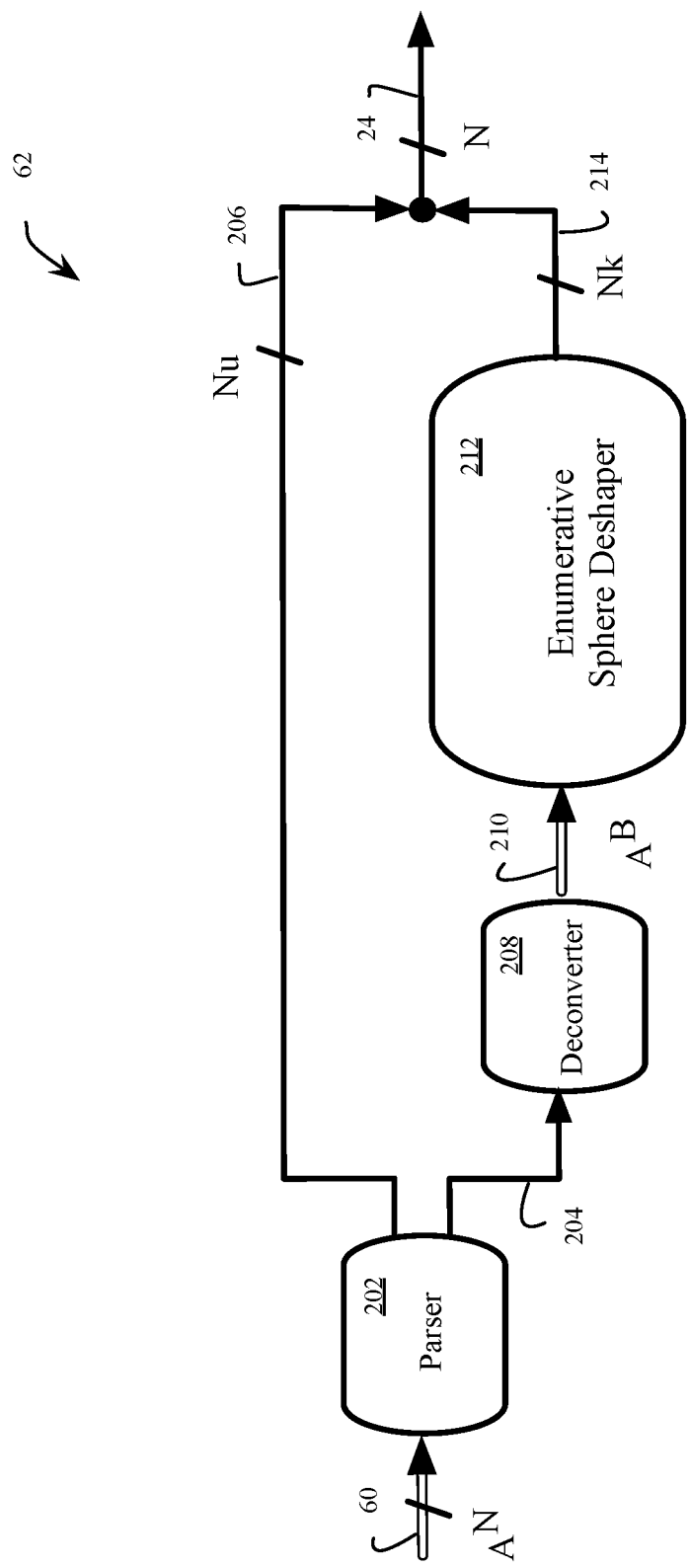
FIG. 8 is a k-bit Enumerative Sphere Deshaper for a multidimensional constellation in accordance with an example embodiment of the present disclosure.

Referring to FIG. 8 with reference to FIG. 1, the deshaper 62 is described. The deshaper 62 performs the inverse function of the shaper 30. Specifically, the deshaper 62 comprises a parser 202 configured to parse the amplitude stream 60 into a first shaped data bit sequence 204 and a second set of uniformly distributed data bits 206. The deshaper 62 comprises a deconverter 208 to deconvert the first shaped data bit sequence 204 to a first unsigned amplitude sequence 210. The first unsigned amplitude sequence 210 is deshaped by an enumerative sphere deshaper 212 to generate a first set of uniformly distributed data bits 214. The first set of uniformly distributed data bits 214 and the second set 206 both form the serial data bit stream 24.

Figure 9:
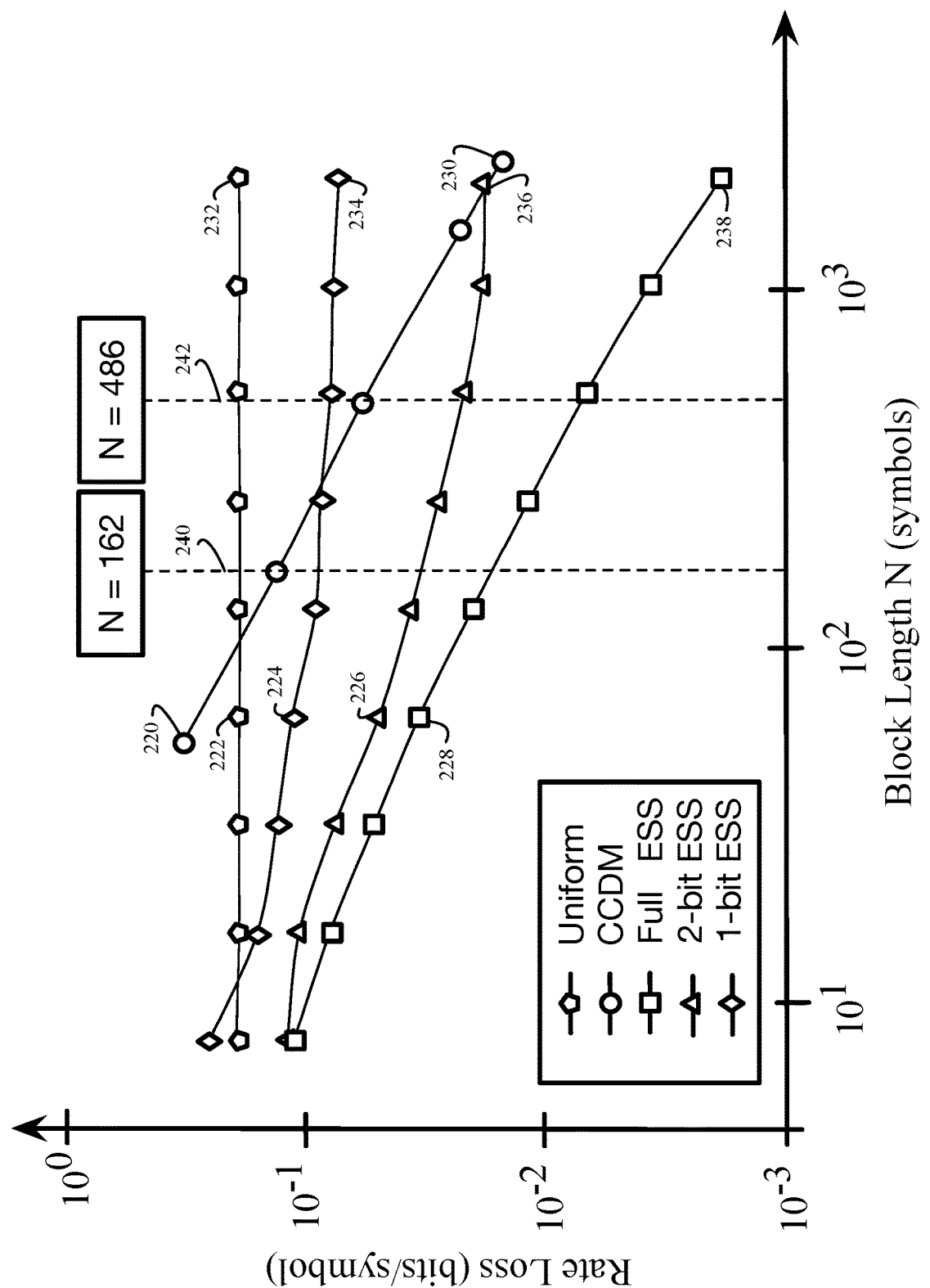
FIG. 9 is a graphical view of rate loss as a function of block length for example embodiments of k-bit enumerative sphere shaping of multidimensional constellations compared to an embodiment for constant composition distribution matching (CCDM) and uniform signaling.
Figure 10:
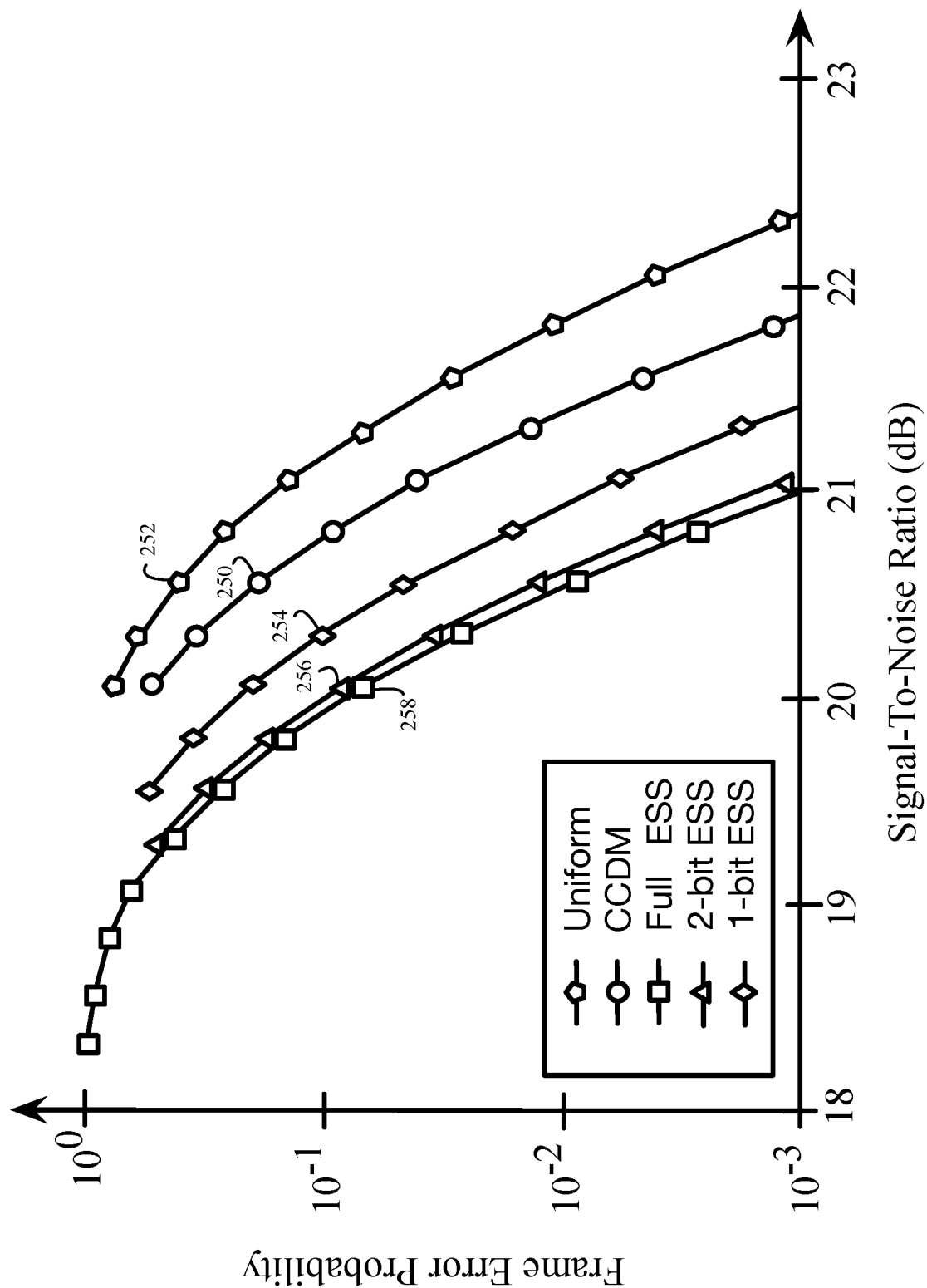
FIG. 10 is a graphical view of frame error probability as a function of signal to noise ratio for example embodiments of k-bit enumerative sphere shaping of multidimensional constellations compared to an embodiment for constant composition distribution matching (CCDM) and uniform signaling, with a block length of 162.
Figure 11:
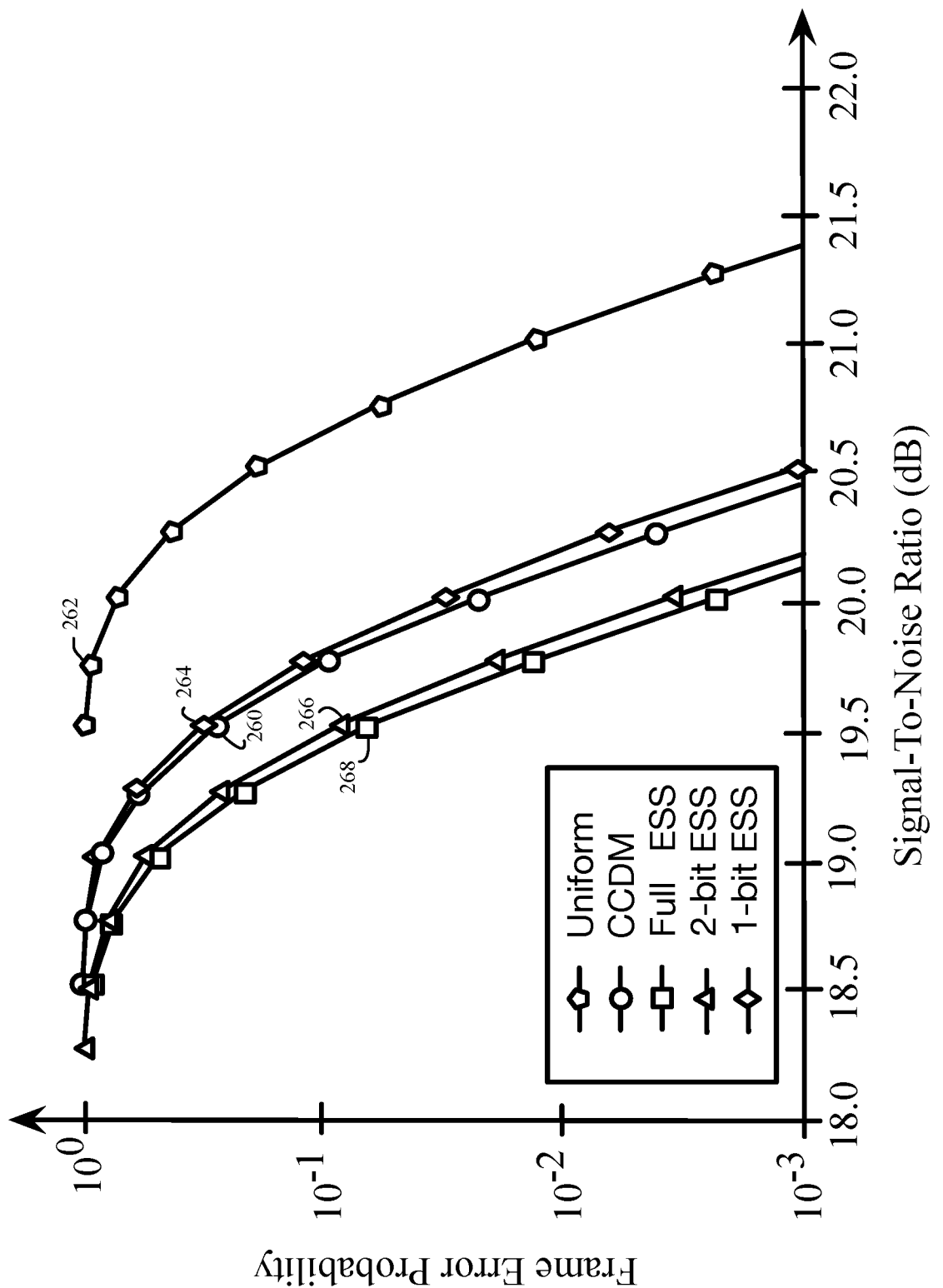
FIG. 11 is a graphical view of frame error probability as a function of signal to noise ratio for example embodiments of k-bit enumerative sphere shaping of multidimensional constellations compared to an embodiment for constant composition distribution matching (CCDM) and uniform signaling, with a block length of 486.

FIG. 9, FIG. 10 and FIG. 11 show the effectiveness of the k-bit ESS compared to a Constant Composition Distribution Matching (CCDM) shaping technique, which is a popular industry benchmark for shaping information bits. FIG. 9 shows the effect on rate loss for a full and partial ESS over block length compared to CCDM. Specifically the CCDM 220 technique at short block lengths (e.g. path length) of less than 100 blocks, exhibits a higher rate loss than the k-bit ESS method using uniform bits 222 (e.g., no sphere shaping), 1-bit ESS 224, 2-bit ESS 226 and full ESS 228. At a block length of 162 (shown by line 240), the CCDM technique remains inferior to even a 1-bit ESS, with the remaining bits being unshaped or uniform. At a block length of 486 (shown by line 242), CCDM outperforms a 1-bit ESS but has a higher rate loss than a 2-bit ESS system. Finally, for block-lengths exceeding a 1000, the CCDM 230 is only inferior to a full ESS system 238. When all the information bits are uniform 232, or only 1-bit is shaped with ESS 234, CCDM has a low rate loss. A 2-bit ESS 236 has a comparable rate loss to the CCDM system 230 at block lengths exceeding 1000. Thus, the k-bit ESS system results in lower rate loss compared to the CCDM technique for short to medium block lengths.

FIG. 10 compares the Frame Error Probability (FEP) relative to the SNR for ESS shaping and CCDM, using a block length of 162. A CCDM FEP is shown as 250. FEP using O-bit shaping (e.g., uniform), 1-bit ESS, 2-bit ESS and full ESS is shown as 252, 254, 256 and 258 respectively. FIG. 11 compares the Frame Error Probability (FEP) relative to the SNR for ESS shaping and CCDM, using a block length of 486. A CCDM FEP is shown as 260. FEP using O-bit shaping (e.g., uniform), 1-bit ESS, 2-bit ESS and full ESS is shown as 262, 264, 266 and 268 respectively. In both FIG. 10 and FIG. 11 the performance of a full ESS system and k-bit ESS where two of three bits are shaped and the remaining bit remains uniform is sufficiently similar to warrant the reduction in storage and computational requirements. Furthermore FIG. 11 shows that the CCDM technique comes closer to the full ESS performance at longer block lengths, consistent with FIG. 9.

Figure 12:
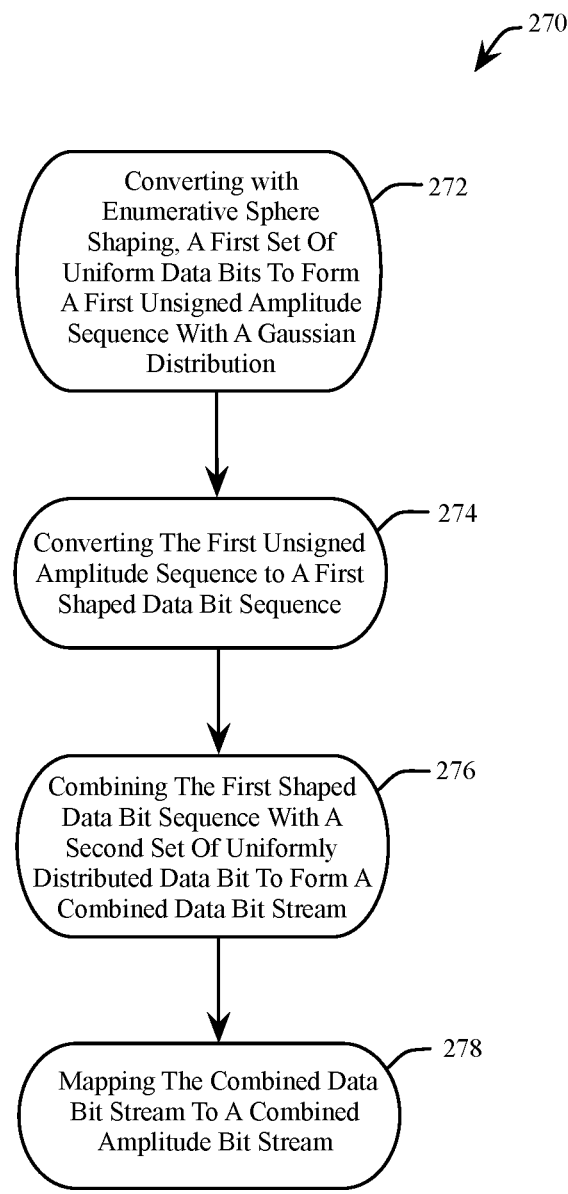
FIG. 12 is a flowchart representation of a method for k-bit enumerative sphere shaping of multidimensional constellations in accordance with an example embodiment of the present disclosure.

FIG. 12 shows an embodiment 270 of a method for k-bit ESS of multidimensional constellations. Referring to FIG. 12 and FIG. 5, at 272, a first set of uniform data bits 156 is converted with an ESS 160 to form a first unsigned amplitude sequence 162 with a Gaussian distribution. At 274, the first unsigned amplitude sequence 162 is converted, with a converter 164, to a first shaped data bit sequence 166. At 276, the first shaped data bit sequence 166 is combined with a second set of uniformly distributed data bits 158, using a combiner 168, to form a combined data bit stream. At 278, the combined data bit stream is mapped to a combined amplitude bit stream 32.

As will be appreciated, embodiments as disclosed include at least the following. In one embodiment, a method for k-bit Enumerative Sphere Shaping (ESS) of multidimensional constellations comprises converting a first set of a plurality of uniformly distributed data bits from a serial data bit stream to a first unsigned amplitude sequence comprising a plurality of amplitudes bounded by a spherical constellation of maximum energy levels of a plurality of energy levels, wherein the first unsigned amplitude sequence has a Gaussian distribution and each of the energy levels is determined by a respective one of the amplitudes in the amplitude sequence. The first unsigned amplitude sequence is converted to a first shaped data bit sequence. The first shaped data bit sequence is combined with a second set of a one or more uniformly distributed data bits from the serial data bit stream to form a combined data stream. The combined data stream is mapped to a combined amplitude stream.

Alternative embodiments of the method for k-bit Enumerative Sphere Shaping (ESS) of multidimensional constellations include one of the following features, or any combination thereof. Converting the first set of uniformly distributed data bits to the first unsigned amplitude sequence further comprises assigning a first symbol to the first unsigned amplitude sequence, wherein the first symbol is defined by an indexed path in a trellis comprising a path length equal to a number of amplitudes in the first unsigned amplitude sequence. The first unsigned amplitude sequence is determined from a lexicographical ordering of a plurality of amplitudes defined by the spherical constellation. The plurality of amplitudes are defined by an Amplitude Shift Keying modulation method. A uniformly distributed sign bit is added to each of the respective amplitudes in the combined amplitude bit stream with an encoder. The combined amplitude bit stream is encoded with an encoder configured to implement an 802.11 encoding protocol. The combined amplitude stream is encoded with a Forward Error Correction encoder. The second set of uniformly distributed data bits includes one of a Most Significant Bit and a Least Significant Bit of the serial data bit stream. An encoded version of the combined amplitude stream is transmitted over a communication channel.

In another embodiment, an apparatus for k-bit Enumerative Sphere Shaping (ESS) of multidimensional constellations comprises an ESS circuit configured to convert a first set of a plurality of uniformly distributed data bits from a serial data bit stream to a first unsigned amplitude sequence comprising a plurality of amplitudes bounded by a spherical constellation of maximum energy levels of a plurality of energy levels, wherein the first unsigned amplitude sequence has a Gaussian distribution and each of the energy levels is determined by a respective one of the amplitudes in the amplitude sequence. A converter is configured to convert the first unsigned amplitude sequence to a first shaped data bit sequence. A combiner is configured to combine the first shaped data bit sequence with a second set of a one or more uniformly distributed data bits from the serial data bit stream to form a combined data stream, and to map the combined data stream to a combined amplitude stream.

Alternative embodiments of the apparatus for k-bit Enumerative Sphere Shaping (ESS) of multidimensional constellations include one of the following features, or any combination thereof. A first symbol is defined by an indexed path in a trellis comprising a path length equal to a number of amplitudes in the first unsigned amplitude sequence. The first unsigned amplitude sequence is determined from a lexicographical ordering of a plurality of amplitude sequences defined by the spherical constellation. The plurality of amplitudes are defined by an Amplitude Shift Keying modulation method. The second set of uniformly distributed data bits includes one of a Most Significant Bit and a Least Significant Bit of the serial data bit stream. An encoder is configured to add a uniformly distributed sign bit to each of the respective amplitudes in the combined amplitude bit stream. The encoder is configured to implement an 802.11 encoding protocol. A transmitter is configured to transmit an encoded version of the combined amplitude stream over a communication channel.

In another embodiment, an apparatus for k-bit Enumerative Sphere Deshaping of multidimensional constellations comprises a demapper-decoder configured to receive a shaped symbol stream from a communication channel, and to convert the shaped symbol stream to an amplitude stream. A parser is configured to parse the amplitude stream into a first shaped data bit sequence and a second set of a one or more uniformly distributed data bits, wherein a serial data bit stream comprises the second set. A deconverter is configured to convert the first shaped data bit sequence to a first unsigned amplitude sequence. An Enumerative Sphere Deshaping circuit is configured to convert the first unsigned amplitude sequence to a first set of a plurality of uniformly distributed data bits, wherein the serial data bit stream further comprises the first set, the first unsigned amplitude sequence comprises a plurality of amplitudes bounded by a spherical constellation of maximum energy levels of a plurality of energy levels, the first unsigned amplitude sequence has a Gaussian distribution, and each of the energy levels is determined by a respective one of the amplitudes in the amplitude sequence.

Alternative embodiments of the apparatus for k-bit Enumerative Sphere Deshaping of multidimensional constellations include one of the following features, or any combination thereof. A first symbol is defined by an indexed path in a trellis comprising a path length equal to a number of amplitudes in the first unsigned amplitude sequence. The first unsigned amplitude sequence is determined from a lexicographical ordering of a plurality of amplitudes defined by the spherical constellation.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for k-bit Enumerative Sphere Shaping (ESS) of multidimensional constellations comprising:
    converting a first set of a plurality of uniformly distributed data bits from a serial data bit stream to a first unsigned amplitude sequence comprising a plurality of amplitudes bounded by a spherical constellation of maximum energy levels of a plurality of energy levels, wherein the first unsigned amplitude sequence has a Gaussian distribution and each of the energy levels is determined by a respective one of the amplitudes in the amplitude sequence;
    converting the first unsigned amplitude sequence to a first shaped data bit sequence;
    combining the first shaped data bit sequence with a second set of a one or more uniformly distributed data bits from the serial data bit stream to form a combined data stream; and
    mapping the combined data stream to a combined amplitude stream.

2. The method of claim 1 wherein converting the first set of uniformly distributed data bits to the first unsigned amplitude sequence further comprises assigning a first symbol to the first unsigned amplitude sequence, wherein the first symbol is defined by an indexed path in a trellis comprising a path length equal to a number of amplitudes in the first unsigned amplitude sequence.

3. The method of claim 1 further comprising determining the first unsigned amplitude sequence from a lexicographical ordering of a plurality of amplitudes defined by the spherical constellation.

4. The method of claim 1 wherein the plurality of amplitudes are defined by Amplitude Shift Keying modulation.

5. The method of claim 1 further comprising adding a uniformly distributed sign bit to each of the respective amplitudes in the combined amplitude bit stream with an encoder.

6. The method of claim 1 further comprising encoding the combined amplitude bit stream with an encoder configured to implement an 802.11 encoding protocol.

7. The method of claim 1 further comprising encoding the combined amplitude stream with a Forward Error Correction encoder.

8. The method of claim 1 wherein the second set of uniformly distributed data bits includes one of a Most Significant Bit and a Least Significant Bit of the serial data bit stream.

9. The method of claim 1 further comprising transmitting an encoded version of the combined amplitude stream over a communication channel.

10. An apparatus for k-bit Enumerative Sphere Shaping (ESS) of multidimensional constellations comprising:
  an ESS circuit configured to convert a first set of a plurality of uniformly distributed data bits from a serial data bit stream to a first unsigned amplitude sequence comprising a plurality of amplitudes bounded by a spherical constellation of maximum energy levels of a plurality of energy levels, wherein the first unsigned amplitude sequence has a Gaussian distribution and each of the energy levels is determined by a respective one of the amplitudes in the amplitude sequence;
  a converter configured to convert the first unsigned amplitude sequence to a first shaped data bit sequence; and
  a combiner configured to combine the first shaped data bit sequence with a second set of a one or more uniformly distributed data bits from the serial data bit stream to form a combined data stream, and to map the combined data stream to a combined amplitude stream.

11. The apparatus of claim 10 wherein a first symbol is defined by an indexed path in a trellis comprising a path length equal to a number of amplitudes in the first unsigned amplitude sequence.

12. The apparatus of claim 10 wherein the first unsigned amplitude sequence is determined from a lexicographical ordering of a plurality of amplitude sequences defined by the spherical constellation.

13. The apparatus of claim 10 wherein the plurality of amplitudes are defined by Amplitude Shift Keying modulation.

14. The apparatus of claim 10 wherein the second set of uniformly distributed data bits includes one of a Most Significant Bit and a Least Significant Bit of the serial data bit stream.

15. The apparatus of claim 10 further comprising an encoder configured to add a uniformly distributed sign bit to each of the respective amplitudes in the combined amplitude bit stream.

16. The apparatus of claim 15 wherein the encoder is configured to implement an 802.11 encoding protocol.

17. The apparatus of claim 10 further comprising a transmitter configured to transmit an encoded version of the combined amplitude stream over a communication channel.

18. An apparatus for k-bit Enumerative Sphere Deshaping of multidimensional constellations comprising:
  a demapper-decoder configured to receive a shaped symbol stream from a communication channel, and to convert the shaped symbol stream into an amplitude stream;
  a parser configured to parse the amplitude stream into a first shaped data bit sequence and a second set of a one or more uniformly distributed data bits, wherein a serial data bit stream comprises the second set;
  a deconverter configured to convert the first shaped data bit sequence to a first unsigned amplitude sequence; and
  an Enumerative Sphere Deshaping circuit configured to convert the first unsigned amplitude sequence to a first set of a plurality of uniformly distributed data bits, wherein the serial data bit stream further comprises the first set, the first unsigned amplitude sequence comprises a plurality of amplitudes bounded by a spherical constellation of maximum energy levels of a plurality of energy levels, the first unsigned amplitude sequence has a Gaussian distribution, and each of the energy levels is determined by a respective one of the amplitudes in the amplitude sequence.

19. The apparatus of claim 18 wherein a first symbol is defined by an indexed path in a trellis comprising a path length equal to a number of amplitudes in the first unsigned amplitude sequence.

20. The apparatus of claim 18 wherein the first unsigned amplitude sequence is determined from a lexicographical ordering of a plurality of amplitudes defined by the spherical constellation.

* * * * *